June 22, 1954  HIROSHI ITO  2,681,594
PHOTOGRAPHIC OBJECTIVE OF GAUSS-TYPE
Filed June 29, 1951
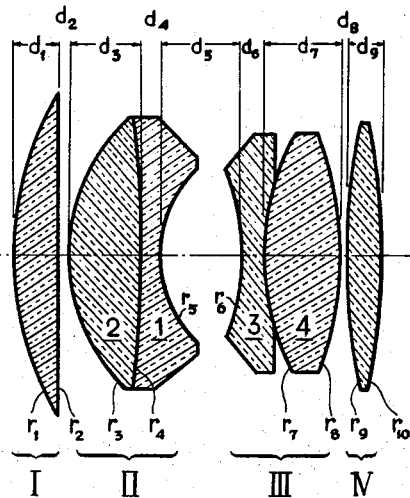
INVENTOR.
HIROSHI ITO Patented June 22, 1954

2,681,594

UNITED STATES PATENT OFFICE 2,681,594

PHOTOGRAPHIC OBJECTIVE OF GAUSS-TYPE

Hiroshi Ito, Setagaya-ku, Tokyo, Japan, assignor to Canon Camera Company, Ltd., Chuouku, Tokyo, Japan, a corporation of Japan Application June 29, 1951, Serial No. 234,353

Claims priority, application Japan November 7, 1950

3 Claims. (Cl. 88—57)

The present invention relates to an improved photographic objective of the so-called Gaussian construction, that is, quadruplets consisting of four simple or compound lenses, and more particularly to quadruplets of which at least the inside elements are compound lenses.

The object of the present invention is to remove substantially completely all remaining coma in such quadruplet photographic objectives, even where the including field exceeds 40 degrees.

In the prior known objectives of the Gauss type having an including field of 40 degrees or more, the oblique spherical aberration (i. e. coma) due to oblique pencils of light focusing on intermediate portions of the picture area is bound to be over-corrected in order to adequately remove other aberrations. This handicap which has ever been considered to be substantially unremediable, has made it extremely difficult to increase the aperture of an objective above F:2 without its resolving power being adversely affected.

In a well known lens of the Gauss type, there is only a very small difference between the refractive indices of the convex and concave lenses cemented together to form the meniscus compound lenses, one of which meniscus lenses is positioned to each of the two opposite sides of the stop or diaphragm in such manner that the cemented surfaces function almost solely to remove the chromatic aberration. At the same time the correction of spherical aberration on the axis of such lens system depends mainly on the two concave faces ($r_5$) ($r_6$) of the respective compound meniscus lenses facing each other across the stop (see the attached drawing). In this case, face ($r_6$) especially acts strongly and causes over-correction of the oblique spherical aberration.

Thus it may be assumed that to decrease the said influence of face ($r_6$) while still removing spherical aberration due to oblique pencils of light focusing on intermediate portions of the picture area, the function of correcting for spherical aberration at the axis, now assigned to surface $r_6$, should be transferred wholly or in part to other surfaces of the objective. By making such transfer of function, there is obtained an excellent lens system free of the residual coma heretofore present in prior known objectives of the identified type.

My investigations have made it clear that it is most advantageous to have a part of the function heretofore assigned to surface $r_6$ taken over by the cemented interface $r_4$ of the cemented compound meniscus lens on the front or object side of the objective. I accomplish this transfer of function in the objective of the instant invention by making the concave lens component of the front or object side meniscus lens of a glass having an index of refraction markedly higher than the index of refraction of the glass of the convex lens component of such compound meniscus lens, imparting to the cemented interface of the two components a concave curvature.

Thus a part of the function of face ($r_6$) is allotted to face ($r_4$), which has hitherto been burdened only with the task of correcting for chromatic aberration. However, by so increasing the refractive index of the concave lens the Petzval sum of the objective will necessarily be increased, which would result in the inability to get a plane image. In order to overcome this handicap, the refractive index of the component concave lens of the rear or image side cemented compound meniscus lens, contrary to the case of the concave lens component of the object side meniscus lens, is made considerably lower than that of its convex lens component, their cemented interface being given a convex curvature.

The photographic objective of Gaussian type of the instant invention is shown in an illustrative form in the single figure of the annexed drawing showing an axial section through the lens system of the objective, and will now be described in detail with reference thereto.

The objective of the instant invention is essentially a quadruplet comprising two compound meniscus lenses II and III axially aligned with, and positioned between, two simple convergent lenses, the front or object side lens I and the rear or image side lens IV. Concave lens component I of the object-side compound lens II is made of a glass whose refractive index is higher by more than 0.05 than that of the glass of which convex lens 2, cemented at interface $r_4$ thereto, is made. Concave lens component 3 of the image-side compound lens III, on the other hand, is made of a glass whose refractive index is lower by more than 0.05 than that of the glass of which convex lens component 4 of compound lens III is made, which is cemented thereto at interface $r_7$. The cemented interface $r_4$ of lenses I and 2 is given a concave curvature in respect of the object side of the objective, while the cemented interface $r_7$ is given a convex curvature in respect of the object side. Such a lens system entirely eliminates coma in objectives of the Gaussian type having including fields of more than 40 degrees. The constructional data for such an illustrative objective corrected in accordance with the instant invention for an including field of 46 degrees is as follows, where the column headed "r" identifies the respective lens radii as referenced in the figure, "d" the axial lens thickness, respectively air separation, the third column giving the indices of refraction of the glasses of the lenses, and the fourth column the Abbe numbers of such glasses:

[f=1.00    F:1.8    Field angle, 46°]

| r | d | Refractive Index | Abbe Numbers |
|---|---|---|---|
| I { 1= 0.5800 | 1=0.095 | 1.6204 | 60.3 |
|     2= 3.800 | 2=0.005 | | |
| II { 3= 0.3570 | 3=0.145 | 1.6261 | 39.1 |
|      4=−2.100 | 4=0.044 | 1.7400 | 28.2 |
|      5= 0.2410 | 5=0.132 | | |
| III { 6=−0.5625 | 6=0.035 | 1.5014 | 56.5 |
|       7= 0.4380 | 7=0.165 | 1.6385 | 55.5 |
|       8=−0.800 | 8=0.003 | | |
| IV { 9= 1.700 | 9=0.070 | 1.6385 | 55.5 |
|      10=−1.257 | | | |

What I claim is:

1. A photographic objective having substantially decreased residual coma over an including field of at least 40 degrees comprising two meniscus compound lenses concave toward each other and axially aligned between and air separated from two positive lenses, of which the object-side compound meniscus lens has a concave lens component of a glass having an index of refraction higher than that of the convex lens to which it is cemented and higher than that of any other lens and lens component of the objective, the image-side compound meniscus lens has a concave lens component of a glass of an index of refraction substantially lower than that of the convex lens component cemented thereto at an interface and less than that of any other lens and lens component of the objective, the interface of the object-side compound meniscus lens has a curvature concave with respect to the object side, of a radius lying between three and two times the total focal length of the objective, and is adapted to correct at least in part for spherical aberration of the objective, and the interface of the image-side meniscus lens has a curvature convex with respect to the object side of a radius lying between 0.4 and 0.5 times the total focal length of the objective.

2. A photographic objective having substantially decreased residual coma over an including field of at least 40 degrees comprising two meniscus compound lenses concave toward each other and axially aligned between and air separated from two positive lenses, of which the object-side compound meniscus lens has a concave lens component of a glass having an index of refraction higher than that of the convex lens to which it is cemented and higher than that of any other lens and lens component of the objective, the image-side compound meniscus lens has a concave lens component of a glass of an index of refraction substantially lower than that of the convex lens component cemented thereto at an interface and less than that of any other lens and lens component of the objective, the interface of the object-side compound meniscus lens has a curvature concave with respect to the object side and is adapted to correct at least in part for spherical aberration of the objective, the interface of the image-side meniscus lens has a curvature convex with respect to the object side, and the ratio of the absolute value of the radius of curvature of the interface of the object-side meniscus lens to that of the interface of the image-side meniscus lens is substantially 5 to 1.

3. A photographic objective coma corrected over an including field in excess of 40 degrees comprising two compound meniscus lenses with their concave exterior surfaces toward each other, two collective lenses between which the compound meniscus lenses are positioned in alignment with intervening air spaces, the numerical data of the objective being substantially as follows, where $r$ is the radius of the lens surface, $d$ the distance axially between successive lens surfaces, with the subscripts increasing from the object side to the image side of the objective:

[Equivalent focal length=1.00. Relative aperture, F:1.8. Including field, 46 degrees.]

| r | d | Refractive Index | Abbe V |
|---|---|---|---|
| 1= 0.5800 | 1=0.095 | 1.6204 | 60.3 |
| 2= 3.800 | 2=0.005 | | |
| 3= 0.3570 | 3=0.145 | 1.6261 | 39.1 |
| 4=−2.100 | 4=0.044 | 1.7400 | 28.2 |
| 5= 0.2410 | 5=0.132 | | |
| 6=−0.5625 | 6=0.035 | 1.5014 | 56.5 |
| 7= 0.4380 | 7=0.165 | 1.6385 | 55.5 |
| 8=−0.800 | 8=0.003 | | |
| 9= 1.700 | 9=0.070 | 1.6385 | 55.5 |
| 10=−1.257 | | | |

References Cited in the file of this patent

UNITED STATES PATENTS

| Number | Name | Date |
|---|---|---|
| 583,336 | Rudolph | May 25, 1897 |
| 1,786,916 | Merte | Dec. 30, 1930 |
| 2,003,881 | Grosset et al. | June 4, 1935 |
| 2,117,252 | Lee | May 10, 1938 |
| 2,250,337 | Warmisham | July 22, 1941 |
| 2,391,209 | Warmisham | Dec. 18, 1945 |
| 2,455,808 | Reiss | Dec. 7, 1948 |